Nov. 4, 1947.    R. E. BRODIE    2,430,272
ELECTRIC HEATER FOR LIVESTOCK WATERING TANKS
Filed Feb. 21, 1946
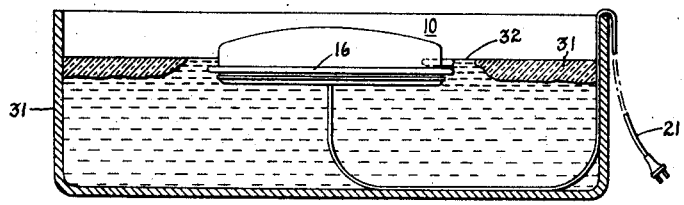
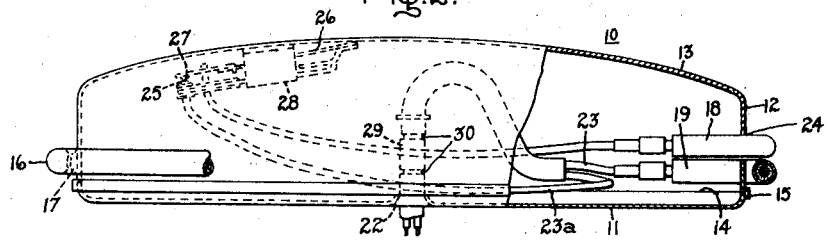
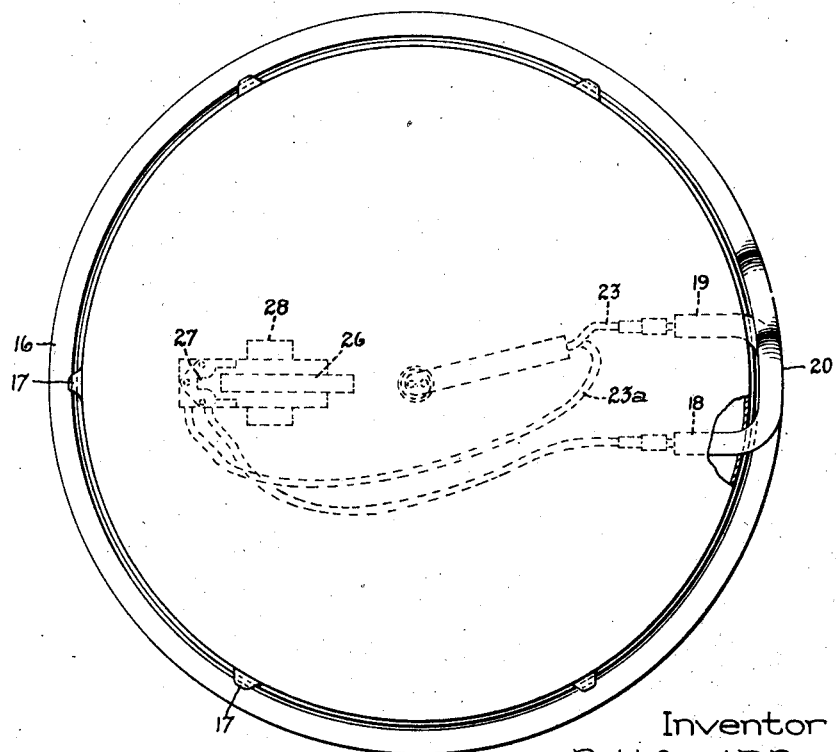
Inventor:
Ruthford E. Brodie,
by *Claude H. Mott*
His Attorney.

Patented Nov. 4, 1947

2,430,272

UNITED STATES PATENT OFFICE 2,430,272

ELECTRIC HEATER FOR LIVESTOCK WATERING TANKS

Ruthford E. Brodie, Dalton, Mass., assignor to General Electric Company, a corporation of New York Application February 21, 1946, Serial No. 649,355

7 Claims. (Cl. 219—44)

My invention relates to electric water heaters, more particularly to floating heaters for livestock watering tanks, and has for its object simple and inexpensive temperature responsive means for controlling a heater in response to the ambient air temperature and the sun's radiant heat.

My invention has special application to floating electric heaters having a small heating capacity as compared with that required to heat the entire body of water in the tank so that it does not heat the entire body of water to any substantial degree but functions to keep the tank open during cold weather by preventing the formation of ice over a small portion of the surface of the water. Such a heater is described and claimed in a copending application, of which my invention is an improvement, Serial No. 629,788 filed on November 20, 1945, by George A. Rietz, and assigned to the same assignee as this invention.

More specifically my invention relates to temperature responsive anticipatory control means for controlling a water tank heater in accordance with changes in the ambient air temperature and the radiant heat from the sun so as to anticipate non-freezing or freezing conditions prior to changes in the temperature of the water itself.

In carrying out my invention in one form, I provide a hollow float on which is mounted electric heating means together with a thermostatic switch for controlling the heating means mounted on the top wall of the float in position to be responsive to the ambient air temperature and the sun's radiant heat.

My invention also comprehends a watertight anchoring connection between the electric supply conductors for the heater and the bottom wall of the float.

For a more complete understanding of my invention, reference is had to the drawing, Fig. 1 of which is a view mainly in section, of a tank provided with a floating heater embodying my invention; Fig. 2 is a side elevation view, partly in section, of the heater, while Fig. 3 is a plan view of the heater shown in Fig. 2.

Referring to the drawing, I have shown my invention in one form as applied to a heater for livestock watering tanks of the type described and claimed in the aforesaid application of George A. Rietz. I provide a hollow sealed metallic body 10 constituting a float which, as shown in the drawing, is somewhat disk-like in form, it being provided with a flat bottom wall 11, a cylindrical peripheral or side wall 12, and a slightly convex top wall 13. The small size of the float, about ten inches in diameter, and its disk-like shape adapt it to be depressed by the livestock. The walls are made of suitable thin sheet material, such as copper, steel or a molded plastic material. Preferably, as shown, the float is stamped or otherwise formed in two parts made of copper having a junction line 14, these parts comprising a bottom part, which consists of the bottom wall 11 with a flange around its periphery, and an upper part consisting of the top wall 13 with a flange around its periphery constituting the side wall 12. The two parts are suitably secured, as by brazing or soldering, to each other and to an overlapping strip 15 at the joint.

The float 10 is provided with electric heating means around its periphery for maintaining the float free of ice formed on the water during cold weather so that it can be readily depressed by the livestock. This heating means as shown consists of metal sheathed electric resistance heater 16 which is bent into an annular or hoop-like form and surrounds the float in such vertical position as to be immersed and in about ⅛" spaced relation with the side wall 12. The heater 16 is secured to the side wall 12 by means of a plurality of projections 17 in equal spaced relation around the side wall to which projections the outer metal sheath of the heater is suitably brazed or soldered. Preferably, the heater 16 is of the type described and claimed in Patent No. 2,112,729 issued on March 29, 1938, to Charles C. Abbott.

For the electrical connection of the ends 18 and 19 of the heater to electric supply conductors, the end portions of the heater are bent at substantially right angles and are inserted through openings 24 in the wall 12 as shown in the drawing, water-tight soldered or brazed joints being provided between the wall and heater. Also, the end portions of the heater on the exterior of the float overlap a short distance, as indicated by the reference numeral 20, one end being offset to provide for this overlap relation.

For the connection of the electric heater to a suitable electric source of supply, such as a conventional lighting circuit, a rubber covered twin conductor electric supply lead or cord 21 is brought into the interior of the float through a central opening 22 in the bottom wall 11. One of the supply conductors 23 is connected directly to the heater terminal 19, while the other supply conductor 23a is connected through a thermostatically operated switch 25 inside the float to the other terminal 18 of the heater.

In accordance with my invention, I provide temperature responsive means inside the float, shown as a bimetallic thermostatic bar 26, for operating the switch 25 in response to the ambient air temperature conditions and the radiant heat of the sun. Preferably, the bar 26 is connected by a suitable over-center snap spring to a pivoted switch contact 27 cooperating with a stationary contact as described and claimed in U. S. Patent No. 2,079,282, issued on May 4, 1937, to Kenneth W. DuBois.

This thermostatic switch including the bar 26 is secured to the inner side of the top wall 13 by means of a suitable bracket 28. Preferably, the thermostat bar 26 is located inside the float in a position of maximum possible response to changes in outside or ambient air temperature and to the sun's radiant heat, and minimum response to the temperature of the water. As shown, the bar has its right hand fixed end in contact with the inner side of the wall 13 to provide for the direct conduction of heat from the wall to the bar. By reason of this mounting for the thermostat, any change in the ambient air temperature or heating of the top wall 13 by radiant heat from the sun is transmitted quickly to the thermostat. This response of the thermostat to air temperature and radiant heat from the sun independently of the temperature of the water has the effect of giving the thermostat an anticipatory response to changes in freezing conditions. For example, if the air temperature suddenly drops, the thermostat is cooled and closes the circuit to the heater before the water has time to freeze. Moreover, during the day the radiant heat from the sun may be sufficient to prevent freezing of the water in the tank, even though the air temperature is below freezing. In such case the thermostat is heated by the sun's heat to deenergize the heater.

A suitable water-tight anchoring connection is provided between the cord 21 and the bottom wall 11 by means of a metallic tube 29, preferably made of copper, surrounding the cord and having its lower end soldered or brazed to the side wall of the opening 22. A watertight, mechanically strong connection is made between the tube 29 and the supply conductor 21 by spinning two grooves in the tube, indicated by the reference numeral 30, whereby the walls of the grooves are compressed tightly on the cord. As a further precaution against leakage, the tube 29 extends upward inside the float to a point somewhat above the water level on the outside of the float. Therefore, in the event of leakage around the cord, the water cannot rise to the upper end of the tube.

As shown in Fig. 1, the float is anchored by the supply cord 21 in place in the tank 31 in position to be reached conveniently by the cattle, horses, sheep, hogs, etc., and tipped and pushed down to give access to the water. As indicated in Fig. 1, the supply cord is preferably draped or hung over the edge of the tank and extends downward to the bottom and thence along the bottom of the tank to a point below the float. It will be understood that the length of the cord resting on the bottom of the tank depends upon the length of the cord that is provided in the tank, since the float when installed with the water free of ice seeks a position with the cord extending substantially vertically downward to the bottom of the tank, as shown in the drawing.

The heater 16 does not supply enough heat when energized to heat appreciably the total volume of water in the tank. In a typical device this heater has a capacity of about 300 watts, which is small as compared with the capacity required to heat the entire body of water sufficiently to prevent freezing. It does, however, supply enough heat to prevent freezing of the water in a narrow zone completely surrounding the float so that the float is always free of ice, even in the coldest winter weather, such as 30° F. below zero or more. The zone of water 32 immediately surrounding the float may, for example, be approximately two inches wide, when the remainder of the surface of the water is covered with a relatively thick layer of ice 31. The slightly convex upper surface of the float minimizes deposits of water, snow or ice on the float and facilitates engagement and depression, as by tilting, of the float by the cattle, horses, or other animals drinking from the tank.

The animals soon learn to tip the float since they readily detect the narrow zone of water around the float. The float is tipped far enough below the surface of the water for convenient drinking of the water by the animal, and the float when released immediately rises to its former position, although this position may be changed somewhat by changes in the water level in the tank. However, if the float should become submerged completely or appreciably under the surrounding ice, it will melt the ice and assume a free floating position. The top wall 13 is maintained by this heater at a temperature substantially above freezing which provides comfort for the animals in depressing the float with their muzzles. The heater will free itself of ice and when submerged under ice tends to melt out a disk of ice, because the most effective heating is adjacent the heater, which disk it lifts somewhat and gradually melts.

While I have shown a particular embodiment of my invention, it will be understood, of course, that I do not wish to be limited thereto since many modifications may be made and I therefore contemplate by the appended claims to cover any such modifications as fall within the true spirit and scope of my invention.

What I claim as new and desire to secure by Letters Patent of the United States is:

1. A heater for stock watering tanks comprising a buoyant body arranged to float on the water in the tank, heating means carried by said body, and temperature responsive control means for said heating means mounted on said body in position to be responsive to the ambient air temperature.

2. A heater for stock watering tanks comprising a buoyant body arranged to float on the water in the tank, heating means carried by said body arranged to heat the water in proximity to said body so as to maintain said body free of ice, and temperature responsive control means for said heating means mounted on said body in position to be responsive to the ambient air temperature substantially independently of the temperature of the water.

3. A floating heater for stock watering tanks comprising walls forming a hollow flat sealed float of such size and shape as to adapt it to be depressed by the stock, an electric resistance heater mounted on said float, switching means mounted inside said float connected in circuit with said heater, a thermostat inside said float operatively connected to said switching means to open and close said switching means in response to changes in temperature, and means mounting said thermostat on a wall of said float in position to be responsive to changes in the ambient air temperature.

4. A floating heater for stock watering tanks comprising a float of such size and shape as to adapt it to be depressed by the stock, an electric resistance heater surrounding said float, means securing said heater to said float in position to be immersed when said float is placed in water, switching means connected in circuit with said heater, a thermostat operatively connected to said switching means to open and close said switching means in response to change in temperature, and means mounting said thermostat on said float in position to be responsive to changes in the ambient air temperature and the sun's radiant heat.

5. A floating heater for stock watering tanks comprising walls forming a hollow flat sealed float of such size and shape as to adapt it to be depressed by the stock, a sheathed electric resistance heater surrounding the periphery of said float having its ends extending through a side wall of said float into the interior thereof, means securing said heater to said float in spaced relation therewith adjacent the bottom of said float in position to be immersed when said float is placed in water, switching means mounted in said float connected in circuit with said heater, a thermostat inside said float operatively connected to said switching means to open and close said switching means in response to changes in temperature, and means mounting said thermostat on the inner top wall of said float in position to be responsive to changes in the ambient air temperature and the sun's radiant heat.

6. A floating heater for stock watering tanks comprising metal walls forming a sealed hollow float adapted to be depressed by the stock, including a bottom wall provided with an aperture, an electric heater mounted on said float, terminals for said heater inside of said float, electrically insulated electric conductors extending through said aperture into the interior of said float and connected electrically to said terminals, and watertight anchoring means for said conductors comprising a tube inside said float surrounding said conductors having one end secured to the wall of said aperture and extending upward to a point above the water level for said float, the wall of said tube being compressed on said conductors to provide a watertight and mechanically strong connection between said conductors and said float.

7. A water heater comprising a buoyant body arranged to float on the water to be heated, an electric resistance heater mounted on said body in position to heat the water in proximity to said body, and temperature responsive control means for said heater mounted on said body in position to be responsive to the ambient air temperature for the control of said heater substantially independently of the temperature of the water.

RUTHFORD E. BRODIE.

REFERENCES CITED

The following references are of record in the file of this patent:

UNITED STATES PATENTS

| Number | Name | Date |
| --- | --- | --- |
| 1,430,548 | Hogue | Oct. 3, 1922 |
| 1,788,515 | Gannon | Jan. 13, 1931 |
| 1,909,973 | Lewis et al. | May 23, 1933 |